United States Patent [19]

Guiliano

[11] Patent Number: 4,569,473
[45] Date of Patent: Feb. 11, 1986

[54] APPARATUS FOR AND METHOD OF DESOLDERING AND REMOVING AN INTEGRATED CIRCUIT FROM A MOUNTING MEMBER AND FOR CLEANING THE SAME

[76] Inventor: John A. Guiliano, 150 Davis St., Hauppauge, N.Y. 11788

[21] Appl. No.: 548,497

[22] Filed: Nov. 3, 1983

[51] Int. Cl.$^4$ .............................................. B23K 3/00
[52] U.S. Cl. ..................... 228/264; 228/20; 228/37; 228/56.1
[58] Field of Search ................ 228/19, 20, 264, 37, 228/56 A

[56] References Cited

U.S. PATENT DOCUMENTS

| Re. 3,575 | 8/1869 | Miller | 228/56 A |
| 3,004,505 | 10/1961 | Dvorak | 228/37 X |
| 3,644,980 | 2/1972 | Class, Jr. | 228/20 X |
| 3,661,315 | 5/1972 | Helton | 228/20 |
| 4,022,370 | 5/1977 | Durney | 228/20 X |
| 4,456,163 | 6/1984 | Zach | 228/19 X |

FOREIGN PATENT DOCUMENTS 924927  4/1982  U.S.S.R. ................................. 228/20

OTHER PUBLICATIONS

Baron, *IBM Technical Disclosure Bulletin*, vol. 20, No. 8, Jan., 1978, pp. 3028–3029.

Primary Examiner—Kenneth J. Ramsey
Attorney, Agent, or Firm—Bauer & Amer

[57] ABSTRACT

Apparatus for and method of desoldering and removing a soldered together integrated circuit from a mounting member and for cleaning the same in which the integrated circuit and the mounting member are placed in tension in preparation of separating the same so that when the securing solder is melted the integrated circuit and mounting member separate from each other. The integrated circuit and mounting member are subjected to a pressurized flow of fluid which bathes the integrated circuit in an enclosure that is completed by the mounting member so that the mounting member and the integrated circuit are cleaned of solder and are also cooled.

17 Claims, 10 Drawing Figures

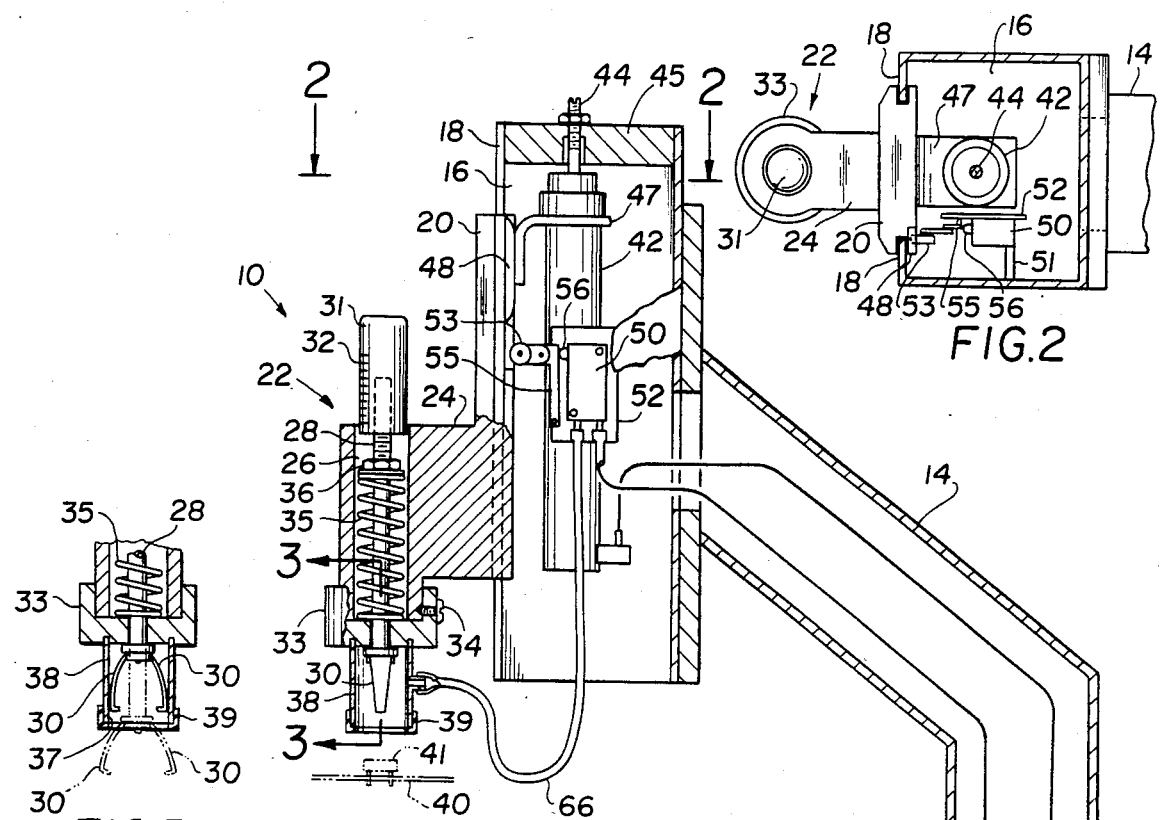
FIG.2
FIG.3
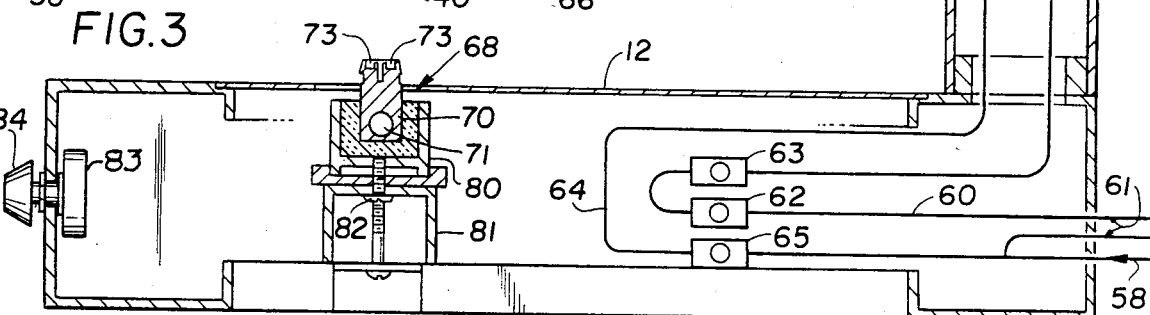
FIG.1
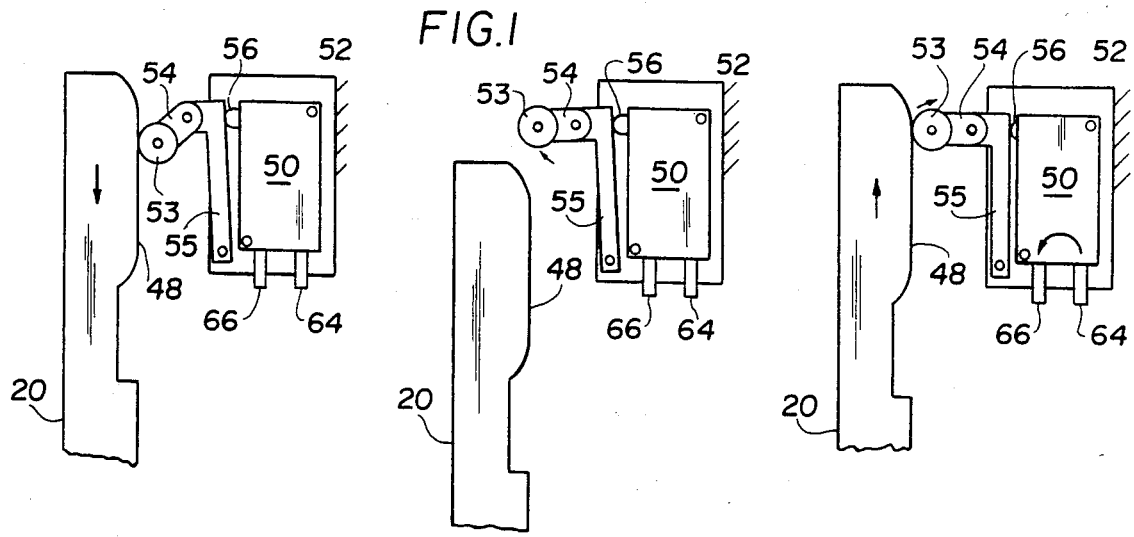
FIG.4  FIG.5  FIG.6

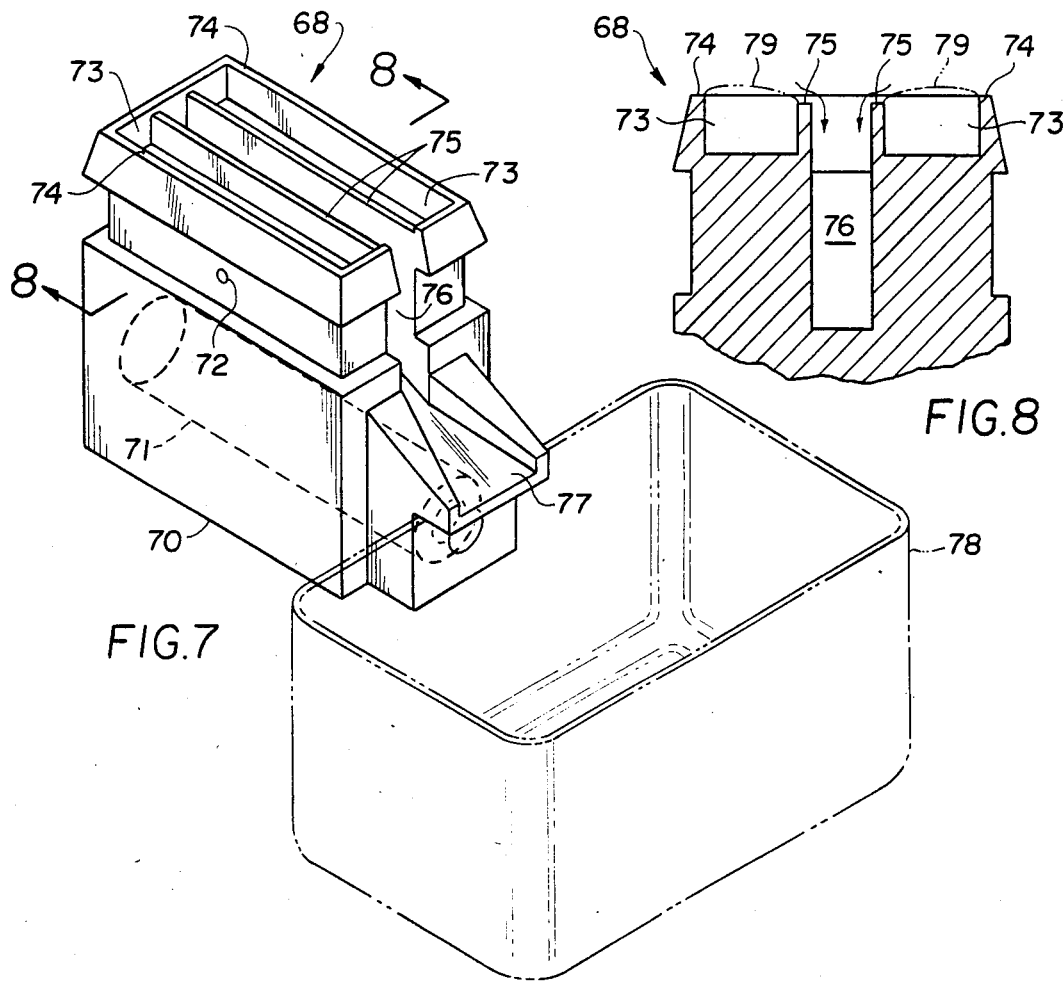
FIG.7
FIG.8
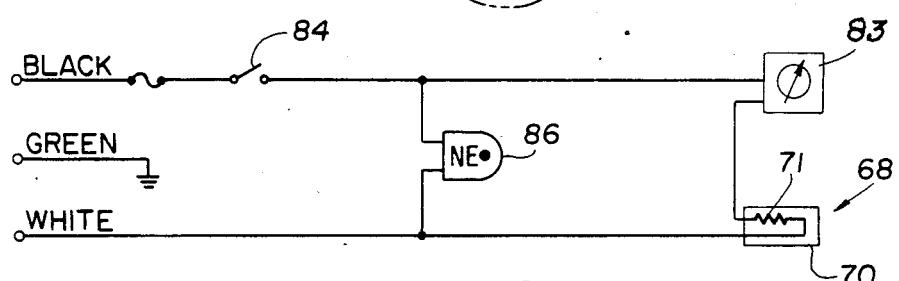
FIG.9
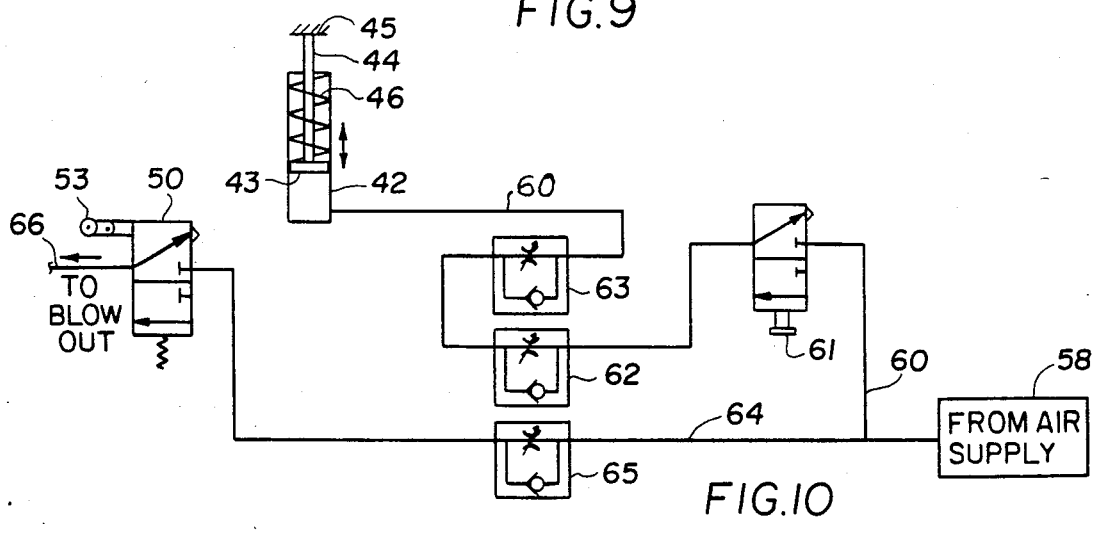
FIG.10

4,569,473

APPARATUS FOR AND METHOD OF DESOLDERING AND REMOVING AN INTEGRATED CIRCUIT FROM A MOUNTING MEMBER AND FOR CLEANING THE SAME

BACKGROUND OF THE INVENTION

The present invention relates to an apparatus that separates and removes integrated circuits and other multi-lead components from their soldered mountings to printed circuit boards and the like. More particularly, the invention cleans both the separated, removed components and the mounting printed circuit boards free of the melted solder that had retained them assembled securely together, and cools the removed parts to avoid damage to the same by the heat that is applied to the solder to melt the same.

In the past there has been a problem in removing integrated circuits and like multi-lead components, as transistors, from printed circuit boards. Oftentimes, after an integrated circuit is soldered into position with its leads in the holes in the printed circuit board, it becomes necessary to remove the circuit component for one reason or another and to replace it or to leave the component leads and/or the holes in the mounting board completely clean and open. The removal of such integrated circuits or components from the mounting circuit board requires the step of melting and releasing the assembling solder at the connections between the components or circuits and the mounting board. In the past this has been accomplished by many apparatuses following different slow and tedious methods.

In many prior art disclosures the melted solder is removed by the use of vacuum which is slow and oftentimes insufficient to remove all of the solder from both the components and the mounting board. Teachings of such devices may be found in the U.S. Pat. No. 3,644,980 to Class et al; Schreckeneder 3,842,478; Wirbser et al 4,066,204; Vandermark 4,193,160; and the German Pat. No. 1943393 to Siemens A.G.

Some prior art disclosures, as exemplified by the U.S. Pat. No. to Palmer 3,990,863, leave the hole of the mounting board filled with the melted solder after removal of the integrated circuit or other components therefrom.

While at least Class et al U.S. Pat. No. 3,644,980 recognizes the problem of overheating the component and the printed circuit board during the melting and removal of the securing solder, little or no effort is expended in preventing the mounting board from heating engagement with the solder heater or for deliberately cooling the desoldered parts to avoid damage thereto by overheating.

Accordingly, the desideratum of the present invention is to provide an automated apparatus by which the integrated circuit or other component can be separated and removed from its secured soldered assembly with a mounting circuit board as a single unit virtually without regard to the number of leads the circuit or component has, and to a method for accomplishing the same.

Other objects and features of the invention reside in the ability to melt the securing solder while separating and removing the integrated circuit or multi-lead component from the mounting printed circuit board without touching or engaging the board with the heater so that only the solder is subjected to heat without subjecting the board or the component to direct contact with the heating source.

Another object and feature of the invention is to clean the integrated circuit or component including its leads and the mounting board free of solder while quickly cooling the same by the use of pressurized fluid to prevent their damage by the heat applied to melt the solder.

Still another feature and object resides in the use of the same pressurized fluid to automatically control the operation of the apparatus in accordance with the method steps of the present invention.

In accomplishing the aforementioned objects, still a further feature of the invention resides in the provision of a unique solder heater which eliminates the need to engage either the printed circuit board or the multi-lead components with the heater structure in order to melt the solder that secures the same together.

The above description, as well as further objects, features and advantages of the present invention, will be more fully appreciated by reference to the following detailed description of a presently preferred, but nonetheless illustrative, emdobiment in accordance with the present invention when taken in conjunction with the accompanying drawings wherein:

BRIEF DESCRIPTION OF THE DRAWINGS

FIG. 1 is a vertical cross-section of the desoldering and cleaning apparatus constructed according to the teaching of the invention;

FIG. 2 is a cross-section of FIG. 1 taken along lines 2—2;

FIG. 3 is a cross-section of FIG. 1 taken along lines 3—3;

FIG. 4 is an enlarged view showing the relative positions of the cam and cam follower of FIG. 1 during a period of descending movement;

FIG. 5 is a view similar to FIG. 4 with the cam in its lowered position;

FIG. 6 is a view similar to FIG. 4 with the cam shown during a rising period of movement;

FIG. 7 is a perspective of the heater assembly;

FIG. 8 is a cross-section of FIG. 7 taken along lines 8—8;

FIG. 9 is a schematic illustration of the electrical circuit; and

FIG. 10 is a schematic illustration of the fluid circuit.

DESCRIPTION OF THE INVENTION

Referring now to the drawing, the apparatus there shown is generally identified by the numeral 10. It includes a base support 12 that has a decoratively angled hollow standard 14 which is provided at its upper end with a through hollow chamber 16. The side of the chamber 16 opposite the standard 14 is slotted vertically to provide two relatively spaced guide walls 18 that receive within and between them for reciprocable relative guided movement a supporting slide 20 of a carrier assembly generally identified by the numeral 22.

Referring to FIGS. 1 and 3, it will be seen that the carrier assembly 22, including the guide slide 20, has a carrier body 24 with a through vertical opening 26 in which a gripper assembly is relatively movable. The gripper assembly includes a threaded shaft 28 to which a plurality of gripper elements in the form of spring fingers 30 are secured. The fingers 30, being of a spring material, have an inherent memory that causes them normally to spring and flex away from each other into a relative outward spaced apart relation as is illustrated in FIG. 3.

The opposite upper end of the shaft 28 has a finger operated button 31 threaded on it and adjustable therealong so that indices or markers 32 provided thereon are clearly visible to the operator of the aparatus 10. Mounted to and in closing relation about the body 24, circumscribing the opening 26, is a rotatable collar 33 that is fixed to the outer neck of the opening 26 and set screws 34 to enable the same to be selectively rotated thereabout and then fixed thereto in a predetermined position of selected adjustment. The inner surface of the adjacent collar 33 forms a seat against which an expanding coil spring 35 rests. The opposite end of the spring 35 applies an expanding tensioning force to a collared adjusting nut 36 threaded on the shaft 28 to permit adjustment of the force applied by the spring to the gripper means 30.

The spring 35 applies its tensioning force to the gripper means 30 by way of the shaft 28 to lift the same into the defines of a generally tapered well 37 that is provided in the outer confining end of the adjusting collar 33. Under normal conditions of operation the spring gripper fingers 30 are pulled upward fully into the well 37 and are forced into a relative closed relationship. The showing in FIG. 3 is for illustrative purposes only so one may recognize that the fingers 30 will expand and separate outward and away from each other when a downward manual force is applied to the button 31 in opposition to the normal closing force of the spring 35.

Mounted to and suspended downward therefrom is a baffle head 38 that may or may not include a separate flexible seal of soft rubber 39, or the like. The separate sealing element 39 may be omitted in the event certain types of mating printed circuit boards 40 having multilead components or integrated circuits 41 thereon will form a substantial fluid tight sealing engagement with the outer lower end of the sleeve shaped baffle head 38. The baffle head 38 functions as a housing enclosure for the receipt and containment of the integrated circuit component 41 fully therewithin. Hence, the seal 39 is provided with an adequately sized opening to facilitate the passage of the component 41 therethrough.

Mounted within the chamber 16 is a carrier assembly operator that includes a fluid operated cylinder 42 that has a reciprocating piston 43 (see FIG. 10) connected with a shaft 44 movable therein and extending outward therefrom. The exposed end of the shaft 44 is fixedly mounted to the top 45 of the chamber 16 so that upon relative reciprocation between the piston 43 and the cylinder 42, the piston remains fixed and the cylinder is caused to move. To maintain the piston and cylinder in a normal starting position of operation whereby the cylinder 42 is normally raised as shown in FIG. 1, there is a return expansion spring 46 that is contained between the interior top of the cylinder 42 and the piston 43 as shown in FIG. 10.

The movable cylinder 42 is connected near its upper end with a carrier slide 20 by a bracket 47 for conjoint reciprocating movement, with the slide being guided in its movement by its tongue and groove engagement with the side walls 18 as is seen in FIG. 2. The slide 20 is provided with a laterally extending cam 48. The lengthwise extent of the cam 48 is predetermined to provide for a selected period of movement of the carrier assembly 22 without effecting operation of a fluid control valve 50 that is fixed or mounted stationary to the interior wall of the hollow chamber 16 by a bracket 51.

The bracket 51 includes a support plate 52 on which the control valve 50 is mounted. The support plate 52 also supports an idler cam that comprises a follower roller 53 connected with an arm 54 that is hinged to a lever 55 pivotally mounted on the plate 52. The pivotal movements of the follower or idler roller 53 moves the arm 54 to actuate a valve contact 56 that controls the operation of the fluid control valve 50 in response to the reciprocating positional movements of the cam 48.

The fluid circuit for operating the apparatus 10 is illustrated in greater detail in FIGS. 1 and 10. The fluid circuit thereshown includes a source of pressurized fluid 58 that may be an air compressor or any other pumping means. Although the fluid here disclosed is air, as the description proceeds it should become clear that other fluids may be used. The source 58 is connected with a supply line 60 which includes a manual control that may comprise a foot pedal 61 or the like. Also included in series in the fluid supply line 60 are adjustable control valves 62 and 63. The remote end of the fluid supply line 60 is connected with the lower end of the operating cylinder 42 to supply the pressurized fluid thereto and, in the reverse, to permit its outflow exhaust therefrom.

A second fluid supply line 64 is connected with the source 58 and also with the fluid control valve 50. A further adjusting control valve 65 is interposed in the line 64 and is located downstream of the point of connection of the first line 60 with the second line 64. The fluid control valve 65 is, in turn, connected with the baffle head housing enclosure 38 by fluid line or conduit 66 to direct the flow of pressurized fluid thereto from the source 58 upon the actuation of its valve contact 56.

Included in the apparatus 10 is a uniquely constructed solder heater generally identified by the numeral 68 that includes a body 70 that accommodates and mounts therein an electrically operated heater coil 71 (FIG. 9). Connected in series circuit with the heater coil 71 is a temperature control 83 that is mounted within the base support 12 for ease of adjustment of the temperature of the solder in the troughs 73 by the operator. Hole 72 supports a thermocouple (not shown) to sense the temperature of the solder in the troughs and may have a visual indicator on the base 12 for viewing by the operator. As is illustrated in FIGS. 1, 7 and 8 of the drawings, the heater 68 is shown with two melted solder troughs 73. Those skilled in the art will readily recognize that any number of such troughs may be provided, although two are illustrated in the drawings for ease of understanding.

Each trough 73 is bordered about its outer perimeter or periphery with a solder confining wall 74. The inner border of each trough 73 is closed by an inner peripheral wall 75 that is of a predetermined shallower or lower height than that of the outer wall. This enables it to function as a dam or weir over which melted solder in its respective trough may overflow from the trough before the solder will overflow the outer walls 74 of its respective trough. Thus, the provision of the lower weir walls 75 assure against the overflow of melted solder from the trough at any point, except at the weirs.

The inner walls 75 are relatively spaced from each other to define an overflow passageway 76 therebetween. The passageway 76 has a lip 77 at its lower end that extends well beyond the body 70 to overlie a catch container 78 into which the overflowing melted solder flows and is captured to prevent it from coming into damaging contact with any other structures of the apparatus 10. In practice it has been found that the cohesive nature of solder contained in its melted state in the trough 73 tends to adhere to the inner surfaces of the defining walls 74 and 75, thereby producing a raised meniscus 79 of melted solder that projects to a substantial height well above that of the heigher outer walls 74 of each trough before overflowing the lower inner walls or weirs 75. This is illustrated more clearly in FIG. 8.

Advantage is taken of this phenomenon when the assembling solder that secures together the component 41 and the mounting board 40 is to be heated to melt and to effect the non-damaging separation and desoldering of the board and the component. Although the term "desoldering" may be subject to many interpretations, it is here used to describe the release of the securing solder that holds together the component 41 and the board 40. It may also be used in the present disclosure to refer to the step of removing the assembling solder from the separated parts. Hence, when employed in the present disclosure, the term "desoldered" and variations thereof is not intended to be specifically limited to any precise step or portion of any such step in the melting and/or the removal of the securing solder.

Previously it was described that the collar 33 and the gripper fingers 30 actuated therein are rotatably adjustable. As will become more apparent as the description proceeds, it is important that the heater 68 also be capable of rotative adjustment in the base support 12 into coincident alignment with the component 41 and the gripper fingers 30 that will grip and hold the same to efficiently effect the melting desoldering of the parts 40 and 41. For this reason, the heater body 70 is supported in a rotatable housing 80 that forms a part of a fixed support 81. The housing 80 is releasably secured to the underside of the support 81 by a readily accessible bolt 82 that is easily manipulated to lock and release the housing 80 for selected rotation.

When the bolt 82 is released, the housing and heater 68 are able to be rotated into coinciding alignment with the gripping fingers 30 and the soldered leads of the component 41. This assures that the solder securing the leads of the component 41 will lower and dip into the raised meniscus of solder 79 therebelow without causing the mounting board 40 to come into heat damaging engagement or contact with the higher walls 74 of the heater 68.

The electrical circuit of FIG. 9 in which the heater coil 71 and temperature control 83 are included also includes a manually operated on-off power switch 84. The switch 84 controls the on-off operation of an indicator light 86 that may from an illuminating part of the switch 84 or may be mounted in any other convenient manner on a visible location of the apparatus 10 so that the operator thereof may clearly see and recognize when the apparatus is in its operating mode.

To effect the operation of the present apparatus 10, the switch 84 is turned to the "on" position which requires its closure from the open position illustrated in FIG. 9 such that the indicating lamp or light 86 will illuminate. This provides an indication to the operator of the apparatus that the same is in its operating mode. When the switch 84 is closed, the circuit to the electric heater element or coil 71 is also initiated thereby causing the same to heat the heater assembly 68. Solder is initially applied to the trough 73 thereof after the container 78 is positioned beneath the lip 77 of the overflow passageway 76.

As the heat increases in the heater assembly 68, the solder positioned in the troughs thereof will melt and will rise within the troughs to form the raised meniscus phenomenon 79 as is illustrated in FIG. 8. The increased height of the meniscus of solder 79 above the height of the higher bordering wall 74 enables the solder in such raised meniscus condition to be utilized to be contacted by the soldered leads of the component 41 when the soldered together assembly of the component 41 and the mounting board 40 are lowered into touching engagement with the heated melted solder 79 in a manner as will be described.

The apparatus 10 is now ready to perform its desoldering operation. An assembled board 40 and component 41 secured together by cooled hardened solder and desired to be desoldered and disassembled and cleaned is now positioned beneath the lower open end of the baffle 38 forming a part of the carrier assembly 22. It is assumed that the angular rotative position of the troughs 73 and the gripper elements 30 of the carrier assembly 22 have been vertically aligned with each other so as to assure that when the component 41 is gripped by the gripper elements 30, the leads of the component 41 will extend downward into the meniscus of solder in each of the troughs 73 therebelow.

In the initial set-up of the apparatus 10, the indicator adjustment button 31 is threaded along the length of the shaft 28 so as to cause a selected one of the indices 32 to align with the top of the opening 26 within which the same fits to thereby provide to the operator a visual indication as to when the gripper fingers 30 are in their fully raised position. Also, it is assumed that in the initial set-up of the apparatus 10, that the spring 35 will have been adjusted to a desired tension sufficient to cause a separating tensioning force to be applied to the component 41 by the gripper fingers 30 when the mounting board 40 is brought into engagement against the underside of the seal 39.

It is also assumed that the infinitely adjustable shaft 44 of the piston 43 will have been previously threadedly adjusted in its top support 45 to control the extent of relative downward movement that the cylinder 42 will traverse. Since each different component 41 and its mounting 40 may require different adjustments, the same are capable of being made at the readily accessible location of the exposed piston shaft 44. As a result of the finite adjustment of the shaft 44, the operator is enabled to control the length of downward movement of the carrier assembly 24 and the extent of which the leads of the soldered component 41 and its securing solder will dip down into the meniscus of heated melted solder 79 in the troughs 73.

The button 31 is now depressed causing the gripper fingers 30 to extend downward and outward beyond the lower defines of the baffle head seal 39. With the fingers 30 exposed beyond the enclosure of the housing baffle head 38 and its seal 39, the operator then grasps the solder assembled mounting board 40 and component 41 and lifts it up into and between the spaced apart gripper fingers 30 so that the gripper fingers will engage with the component 41 when the button 31 is released. Thus, when the component 41 is properly positioned between the extended and exposed gripper fingers 30, the button 31 is rapidly but gradually released enabling the spring 35 to apply its lifting force to the gripper fingers. As the gripper fingers move back upward into the housing enclosure 38, they are moved convergently closer together by the inner baffle walls 37 to grip tightly on the opposite sides of the component 41 and thereby snugly and tightly engage the same.

Complete release of the button 31 now permits the spring 35 to continue to apply a normal lifting force to the component 41 to bring the component fully into and enclosed within the baffle head 38. The enclosure of the component 41 within the baffle head 38 is completed by the lifting engagement of the upper surface of the mounting board 40 into engagement with the exposed outer surface of the seal 39 to effect a sealed and closed engagement relationship between the two. This sealed closed engagement between the board 40 and the seal 39 or the lower end of the baffle head 38 completely encloses the component 41 within the enclosure 38.

At such time the carrier assembly 22 is in its raised position as is illustrated in FIG. 1 and the guide slide 20, with its cam 48, is in its initially raised position as is also shown in FIG. 1. The apparatus 10 is now ready to perform its operating functions automaticaly. Operating fluid is continuously provided from the pressurized fluid supply 58 to the lines 60 and 64. After the operator has properly engaged the component 41 by the gripper fingers 30 and has positioned the mounting board 40 in fluid-tight engagement with the seal 39, the foot pedal 61 is then depressed. This produces a constant supply of fluid under pressure along the line 60 through the foot pedal 61 to the flow control valve 62 which is in series connection with the flow control valve 63 and thereby admits pressurized fluid to the underside of the piston 43 within the cylinder 42. The pressurized fluid entering the piston 42 beneath the piston 43 now causes the cylinder 42 to move down or to lower while the piston remains fixed in its mounted position against the stationary top of the hollow chamber 16. The spring 46 within the cylinder 42 is compressed gradually as the cylinder is caused to move lower gradually by the admitting fluid pressure.

By reason of the bracket connection 47 with the guide slide 20, the guide slide is caused to move or ride down with the lowering of the cylinder 42. The guide slide 20 is guided along the side walls 18 of the hollow chamber 16 and, thus, the previously aligned relationship between the gripper fingers 30 and the trough 73 of the heater assembly 68 is accurately maintained. During the lowering movement of the guide slide 20 the laterally extending cam 48 will gradually come into engagement with the idler cam or follower roller 53. This engagement is depicted in FIG. 4 of the drawings. During such engagement the arm 54 pivots downwardly to permit the roller 53 to ride smoothly along the length of the cam surface 48 without operating the valve contact 56 of the fluid control valve 50.

This allows the fluid control valve 50 to remain inoperative during the downward movement of the cam 48 and its guiding slide 20. However, during such movement the solder that secures together the component 41 and the board 40 in assembled relationship is now brought into touching engagement with the raised meniscus 79 of the melted solder contained within the trough 73 of the solder heater 68. The depth of such engagement and the extent thereof is selectively controlled and predetermined by the adjustment of the shaft 44 within the stationary top 45 of the chamber 16 as previously described. Hence, it is possible to precisely locate and determine the extent of the downward movement of the cylinder 42 as well as the guide slide 20 and the carrier assembly 22 with respect to the height of the meniscus of melted solder 79 contained within the troughs 73 because it is important that the underside of the mounting board 40 not be brought into heating touching engagement or contact with the surrounding higher walls 74 of the heater assembly 68. To permit the same to do so could result in overheating or burning damage to the surface of the mounting board 40 rendering the same unusable at another time.

Almost immediately upon contact with the meniscus 79, the assembling solder that secures the component 41 and board 40 together begins to melt and relax its securement of such parts. During the period of time that the assembling solder remains in its unmelted state, it secures together the component 41 and the mounting board 40. At the same time tensioning force applied to the gripper fingers 30 by the spring 35 lifts the component 41 into and retains it within the enclosure of the baffle head. Also, the mounting member 40 is retained in closing sealing relationship with the seal 39. However, within a mere matter of seconds the heat of the raised meniscus of melted solder 79 is transferred to the assembling securing solder between the component 41 and the mounting board 40 causing such securing solder to melt rapidly.

As the securing solder melts, the tension force applied to the component 41 begins to separate the leads of the component 41 from the holes of the mounting board 40. When the securing solder melts sufficiently, the lifting force of spring 35 is applied to the component 41 to move it to separate and remove from the holes of the board 40. During this movenent the gripper fingers 30 will rise with component 41 within the housing of the baffle head 38 causing the button 31 to rise upward and beyond the height of the opening 26. The rising movement of the button is a visual indication to the operator that the component 41 is no longer soldered to and engaged in the holes of the board 40.

At that point the operator removes the foot pressure from the foot pedal 61. This immediately causes a reversal of the flow of fluid in the lines 60 and 64. Fluid is now diverted through the foot pedal 61 to permit the exhaust of the fluid from the lower end of the cylinder 42 and from beneath the piston head 43 to permit the spring 46 to return the cylinder 42 to its uppermost starting position as is shown in FIG. 1. Fluid forced out of and escaping from the lower end of the cylinder travels back to the control valve 63 and from there to the control valve 62 and by way of the fluid line 60 through the foot pedal 61 to be exhausted from the system.

The speed of movement or reverse flow of the fluid through the valves 63 and 62 is controlled by the operation of the adjustable valve 63. Thus, by adjustment of the valve 63 it is possible to control the release or exhaust of the fluid from beneath the piston 43 and the return reciprocation of the cylinder 42 to thereby control the speed at which the carrier assembly 22 will rise away from the heater assembly 68 and back to its initial starting position. At this point it is interesting to note that the initial downward movement of the carrier assembly 22 may be controlled, in a like manner, by the adjustment of the valve 62 which has an adjusting screw provided thereon for such purpose.

Hence, adjustment of the valve 62 will permit an intimate control of the flow of fluid from the air supply 58 into the cylinder 42 and thereby control the speed of downward movement of the carrier 22. On the other hand, the adjustment of the control valve 63 controls the exhaust flow of movement of fluid from the cylinder 42 back through the foot pedal 61 to exhaust from the system.

As illustrated in FIG. 5, when the carrier assembly 22 is in its lowermost position its cam 48 is positioned below and out of engagement with the idler cam follower roller 53. This relationship permitted the arm 54 to pivot upward into its horizontal position as is shown in FIG. 5 after the cam 48 moved below the idler roller 53. Now that fluid is being forced out of the cylinder 42 by way of the first fluid line 60, the cylinder 42 is now permitted to rise bringing with it the guide slide 20 and the carrier assembly 22 along with the laterally extending cam 48. This is depicted more clearly in FIG. 6. There the guide slide 20 is shown during a period of its rising movement and the cam 48 is now being brought into engaging actuating contact with the idler roller 53.

As the cam 48 moves or reciprocates upwardly with the rising of the cylinder 42, the horizontally disposed support arm 54 and the lever 55 are now caused to move laterally into operating actuation with the valve contact 56. Actuation of the valve contact 56 causes the pressurized fluid emanating from the source of supply 58 along the second line 64 to enter into and flow through the fluid control valve 50 and exiting therefrom by way of the third supply line 66. In this manner the control valve 50 controls the flow of fluid from the pressurized source 58 to direct the same to the enclosed baffle head 38. This flow of fluid is sustained all during the period of upward movement of the carrier assembly 22 as effected by the guide slide connection at 47 with the cylinder 42 and controlled by the time and the length of engagement between the cam 48 with the roller 53 so as to retain the valve contact 56 open.

All during the period of reversal of movement of the cylinder 42 and the carrier assembly 22, the operator of the apparatus 10 will retain the mounting board 40 lifted upward against the seal 39 of the enclosure defined by the baffle head 38 so as to assure that the housing effected by the baffle head 38 is completely closed about the component 41 that is held in the interior thereof by the gripping fingers 30. Hence, from the very beginning and all during the rising movement of the carrier assembly 22 the pressurized cooling fluid is now caused to be diverted to flow into the enclosure of the baffle head 38. Because of the enclosure the fluid is forced to flow around and fully bathe about all of the surfaces of the enclosed component 41.

The strength of the cleaning, cooling pressurized fluid is controlled by the adjustment of the control valve 65 which has provided on it adjusting means in the same manner as do the valves 62 and 63. In this way an intimate control of the strength of the pressurized fluid admitted into the housing of the baffle head 38 can be provided to assure it is sufficient to aid in driving the melted solder off of the component 41 and free of the leads thereof. Simultaneously the forceful flow of the fluid into the housing enclosure of the baffle head 38 effected by the retained seal between the mounting board 40 with the seal 39 performs a cooling effect upon the component 41.

The solder that may be driven free of the component 41 must now flow outward of the housing enclosure 38 because the pressure of the flowing fluid air entering into the baffle head 38 thereabove directs the solder flow downward toward the inner sealing surface of the board 40. This forceful downward flow of the pressurized fluid opens the holes in the board 40 and frees the same of melted solder while driving any melted solder from the leads of the component 41 downward through the open holes of the board 40. As the solder is driven out of the enclosure of the baffle head 38 held closed by the board 40, its direction of flow is downward into the troughs 73 of the heater assembly 68 directly therebeneath.

The operator maintains the integrity of the complete enclosure of the housing of the baffle head 38 by retaining and holding the mounting board 40 into sealing engagement with the seal 39 all during the rising movement of the carrier assembly 22. By so doing, the operator of the apparatus 10 actually forces the pressurized air entering into the baffle head to exit therefrom through only one source, namely, through the holes of the mounting board 40. This assures that the melted solder being driven out of the enclosure 38 and off of the interior surface of the mounting board 40 can exit through only the holes of the mounting board 40 and downward and outward therefrom toward the melted solder meniscus in the troughs 73 therebelow of the heater assembly 68.

As the melted solder is blown downward and outward through the holes of the mounting board 40 into the heater assembly 68 therebelow, it falls into the melted solder in the troughs. This causes the melted solder in the troughs 73 to increase in volume and results in a flow outward therefrom when the amount of solder supplied to the troughs exceeds the height of the weir walls 75 thereof, taking into account the meniscus phenomena. The overflowing melted solder flows downward out of the troughs and over the weirs into the passageway 76 along the extending lip 77 to be caught in the container 78 which may be emptied from time to time.

When the carrier assembly 22 has reciprocated to its starting position, the apparatus 10 is again ready for a new operation in accordance with the steps previously described. The above substantially completes the operative cycle of the apparatus 10 except for the removal of the component 41 from the gripper fingers 30. Before and even while the grippers 30 are depressed by depression of the button 31, the operator lifts free of the foot pedal 61. When the foot is released from the foot pedal 61, the pressurized air entering from the fluid supply 58 merely enters into the line 60 and 64 but is incapable of flowing into the cylinder 42 for a new operation until such time as the foot pedal 61 is again operated.

Although the constant source of pressurized fluid emanating from the source 58 may flow along the line 64 to the fluid control valve 50, the valve remains closed until such time as the cam 48 again actuates the lever 55 to activate the valve contact 56 of the fluid control valve 50. As a consequence, fluid entering the fluid control valve 50 will not leave the same by way of the line 66 to the housing enclosure of the baffle head 38. Hence, the system is now in a safe holding mode awaiting the further operation of the foot pedal 61 by the operator who will then position a new soldered secured assembled component 41 and mounting board 40 beneath the baffle head 38 for engagement by the gripper fingers 30 in the same manner as was previously described.

The apparatus 10 proceeds rapidly and automatically requiring but a matter of seconds for the melting of the assembling securing solder between the leads of the component 41 and the mounting board 40 after the same has been dipped into touching engagement with the raised meniscus of solder 79 in the troughs 73 of the heater assembly 68. The cleaning of the component 41 within the housing enclosure of the baffle head 38 by the pressurized fluid and of the holes and surfaces of the mounting board 40 is accomplished within seconds and these times may be finitely controlled by the adjustment operation of the valves 62 and 63. Obviously, variations of the times and periods of operation may be selectively controlled by the adjustment of such valves. The rotative adjustment of the gripper fingers can be accomplished by the rotation of the adjustable collar 33 which may be positioned in coincidental alignment with the heater assembly 68 by its adjustment in accordance with the manner previously described.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. An apparatus for desoldering and removing an integrated circuit from a printed circuit board and for cleaning the same of solder comprising heater means for heating and melting to a liquid state solder securing together the integrated circuit and printed circuit board, a housing having means for holding within and enclosing the integrated circuit while the integrated circuit and printed circuit board are soldered together to remove the integrated circuit from the printed circuit board when the securing solder is melted by said heater means, seal means for fluid-tight engagement with the printed circuit board to complete the enclosure of said housing about the integrated circuit, means moving said housing and heater means relatively to cause the solder that secures together the integrated circuit and printed circuit board to contact said heater means to melt the solder to release the integrated circuit for removal from the printed circuit board by said holding means, and fluid supply means connected to supply fluid under pressure to the enclosure of said housing and to the integrated circuit held therein and to the printed circuit board engaged with said sealing means to clean the same free of the molten solder and to cool the integrated circuit, said fluid supply being selectively controllable, means connected with said fluid supply to selectively control the direction of the flow of the pressurized fluid to said moving means to cause said relative movement of said housing and heater and to vary the volume of the fluid flow to variably control the speed of said relative movement, and means to supply the fluid thereof under pressure to said housing enclosure to control the rate of removal of melted solder from said integrated circit and printed circuit board and the cooling thereof.

2. An apparatus as in claim 1, said heater having a plurality of relatively spaced solder containing troughs each bordered about their outer peripheries by a confining wall to which molten solder within the trough adheres and forms a raised meniscus that is higher than said wall, and a weir defining a facing wall on each of said relatively spaced troughs, each said weir being lower in height than said outer peripheral walls to cause molten solder therein to flow thereover, and means between each of said troughs to receive the molten solder flowing thereinto over the weir of each respective trough.

3. An apparatus as in claim 2, said heater having an electric heater element and thermocouple means connected with said heater element to control the operation thereof and of the temperature of the melted solder in said troughs.

4. An apparatus as in claim 1, said holding means including a plurality of relatively movable gripper elements, means normally moving said gripper elements closed to grip and hold an integrated circuit within said housing enclosure and to move the printed circuit board into fluid-tight engagement with said sealing means to complete said housing enclosure when the printed circuit board and integrated circuit are secured together.

5. An apparatus as in claim 4, and operable means connected with said gripper elements to move said gripper elements in opposition to said normally moving means to open said gripper elements for gripping an integrated circuit and for releasing the same.

6. The method of separating and removing a soldered together multi-lead electronic component from a mounting member having holes in which leads of the component are soldered and for cleaning the same comprising holding the component in an enclosure and supporting the mounting member outside the enclosure to apply to the component and mounting member a force to separate the same and to remove the component from the mounting member, heating the solder securing together the component and the mounting member to melt the solder to cause it to release the component from its soldered connection with its mounting member, applying fluid under pressure to the enclosure and to the component in the enclosure such that the fluid is contained by the enclosure to flow about the component to clean the component of solder and to cool the same, and directing the fluid within the enclosure to flow out of the holes remaining in the mounting member by the removal of the component therefrom to clean the solder therefrom while causing the fluid in the enclosure to escape from the enclosure through the holes in the mounting member to clean the mounting member of solder and to cool the same, heating the solder securing together the component and mounting member by positioning the securing solder in a pool of heated melted solder contained in a heater while positioning the mounting means free of touching engagement with the heater, completing the enclosure by closing the same with the mounting means to contain the pressurized fluid therein, varying the application of the fluid to control the rate of cleaning and of the cooling of the component and the mounting member.

7. The method as in claim 6, applying the fluid pressure against the surface of the mounting member facing the enclosure to direct the fluid flowing thereagainst to force the melted solder on the mounting member to flow off of the mounting member through the holes remaining therein and into the heater and its pool of heated melted solder.

8. The method as in claim 6, closing the enclosure by the mounting member while applying a tensing force between the component and the mounting member in a direction to remove the component from the mounting member, removing the component by the applied tension from the mounting member when the solder holding them together is melted, and continuing to complete the enclosure by the mounting member.

9. The method as in claim 8, opening the enclosure by removing the mounting member from the same, and releasing the hold on the component.

10. The method of separating and removing a soldered together multi-lead electronic component from a mounting member having holes in which leads of the component are soldered and for cleaning the same comprising
holding the component in an enclosure and supporting the mounting member outside the enclosure to apply to the component and mounting member a force to separate the same and to remove the component from the mounting member,
heating the solder securing together the component and the mounting member to melt the solder to cause it to release the component from its soldered connection with its mounting member,
applying fluid under pressure to the enclosure and to the component in the enclosure such that the fluid is contained by the enclosure to flow about the component to clean the component of solder and to cool the same,
and directing the fluid within the enclosure to flow out of the holes remaining in the mounting member by the removal of the component therefrom to clean the solder therefrom while causing the fluid in the enclosure to escape from the enclosure though the holes in the mounting member to clean the mounting member of solder and to cool the same,
heating the solder by a heater to form a raised miniscus of solder therein,
moving the heater and the enclosure relative to each other by the application of the fluid pressure to position the solder holding together the component and the mounting member within the solder miniscus without engaging the mounting member and heater.

11. The method as in claim 10, varying the fluid to control the rate of relative movement of the heater and the enclosure and to control the rate of cleaning and cooling of the component and the mounting member.

12. An apparatus for separating an assembled multi-lead component and a printed circuit board in which the component leads are soldered in holes in the printed circuit board and for cleaning the same of solder comprising
a movable carrier having housing means on and movable therewith to house the component therein,
gripper means movable with said carrier and relative thereto and within said housing to grip the component and to move the component into and out of said housing,
spring means on said carrier connected with said gripper means to move the same relative to said carrier and normally to a position in said carrier whereby the gripper means grips the component and the component is drawn into said housing means such that the printed circuit board soldered to the component engages with said housing to close the same about the component therein,
said spring means applying a separating force to the component and the printed circuit board to separate the same when the assembling solder is melted,
a heater containing melted solder therein for engagement therewith by the solder of the assembled component and the printed circuit board,
and fluid operated means for moving said carrier to position the solder of the assembly into melting engagement with the melted solder of said heater including means to adjust the positioning of said carrier to limit the extent of said solder melting engagement and to prevent damage to the printed circuit board,
and means operable to supply fluid under pressure to said fluid operated means to move said carrier and to bathe the component in said housing with said pressurized fluid to clean the component of melted solder and to cool the component and to clean the printed circuit board of melted solder and to cool the printed circuit board by flowing outward of said housing through the holes left in the printed circuit board by the separation of the component from the printed circuit board.

13. The apparatus as in claim 12, said fluid operable means being reciprocable in response to the selective application of said fluid pressure thereto and to reciprocably move said carrier to and from said solder melting position.

14. The apparatus as in claim 13, actuating means between said carrier and said fluid operable means to control the period of operation of said fluid operable means automatically and the flow of fluid to said housing in accordance with the position of said carrier.

15. The apparatus as in claim 14, said heater having at least a trough in which the melted solder is contained by surrounding walls such that adhesion between the melted solder and said surrounding walls causes the melted solder to rise to a height above said surrounding walls to enable the solder of the assembled component and printed circuit board to be engaged without damaging engagement between said heater and the printed circuit board.

16. The apparatus as in claim 12, each of said housing and heater being rotatably adjustable to position same in alignment with each other.

17. The apparatus as in claim 12, and means on said gripper means to operate the same in opposition to said spring to cause said gripper means to release its grip on the component.

* * * * *